No. 692,621. Patented Feb. 4, 1902.
J. CHAMBERLIN.
STUBBLE CUTTER ATTACHMENT FOR CORN HARVESTERS.
(Application filed Apr. 18, 1901.)
(No Model.)

WITNESSES.
O. B. Barnziger
b. E. Joslin

INVENTOR.
John Chamberlin
By R. B. Wheeler &c.
Attorneys.

UNITED STATES PATENT OFFICE.

JOHN CHAMBERLIN, OF FLATROCK, MICHIGAN.

STUBBLE-CUTTER ATTACHMENT FOR CORN-HARVESTERS.

SPECIFICATION forming part of Letters Patent No. 692,621, dated February 4, 1902.

Application filed April 18, 1901. Serial No. 56,345. (No model.)

*To all whom it may concern:*

Be it known that I, JOHN CHAMBERLIN, a citizen of the United States, residing at Flatrock, in the county of Wayne, State of Michigan, have invented certain new and useful Improvements in Stubble-Cutter Attachments for Corn-Harvesters; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a stubble-cutter attachment for corn-harvesters; and it consists in the construction and arrangement of parts hereinafter fully set forth, and pointed out particularly in the claims.

The object of the invention is to produce simple and efficient means, adapted for attachment to a corn-harvester, whereby the long stubble left by the harvester may be severed close to the ground to render the ground more readily tillable, to obviate the inconvenience of the long stubbles in harvesting the crop, and to facilitate the decomposition of the stubbles.

The above object is attained by the mechanism illustrated in the accompanying drawings, in which—

Figure 1:
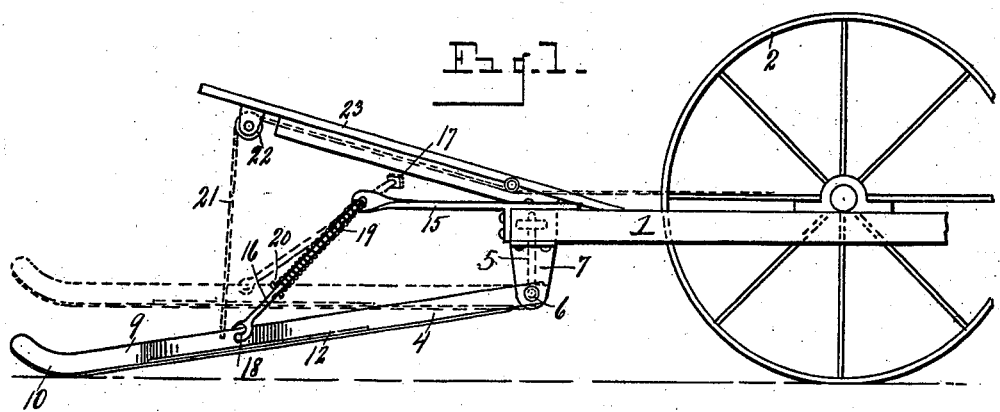
Figure 2:
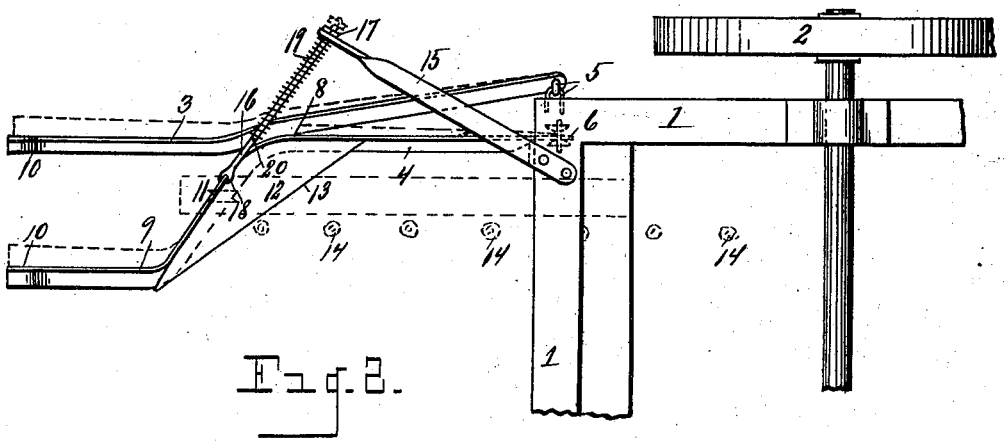

Figure 1 is a side elevation of a portion of a frame mounted upon transporting-wheels and having my improved stubble-cutter attached thereto. Fig. 2 is a plan view of Fig. 1, the structure carrying the chain and pulley which elevate the auxiliary frame being shown in dotted lines.

While it is designed to attach this improved stubble-cutter to a corn-harvester, it is not necessary to illustrate the harvester in detail, and I have therefore only shown a portion of a frame mounted on transporting-wheels in lieu of a harvester proper, as the harvester is in no sense essential to the illustration and operation of the invention.

Referring to the characters of reference, 1 designates a portion of a frame mounted upon transporting-wheels 2.

The stubble-cutter consists of a frame comprising the united angle-bars 3 and 4. The upper end of the bar 3 is loosely attached by means of a ring or link 5 to the frame and inclines downwardly and rearwardly, so that the rear end thereof rests on the ground. The upper end of the bar 4 is loosely pivoted at 6 to a bracket 7, depending from the frame, and from said point of pivot said bar extends downwardly and rearwardly in a straight line to the point 8 of its attachment to the bar 3, at which point said bar 4 curves laterally away from the bar 3 and at the termination of said curved portion is provided with a bend 9, from which point said bar extends rearwardly in a straight line to the ground. The rear end of both of the bars 3 and 4 is provided with a curved portion 10, which serves as a shoe or runner to afford a bearing upon the ground and to prevent said bars from running into the soil should the machine be run backward without first raising said bars.

Extending obliquely across the curved portion 11 of the bar 4 is a knife 12, which is securely fastened to said bar and whose edge 13 is presented at a sharp angle to the row of stubbles 14.

Secured rigidly to the main frame and projecting rearwardly at an angle therefrom is a bar 15, adapted to support the upper end of the rod 16, which passes freely therethrough and receives upon its projecting end a nut 17. The lower end of the rod 16 is provided with an eye 18, which engages loosely in the flange of the bar 4 at the center of the inclined or curved portion 11. Mounted upon the rod 16 is a coiled spring 19, whose lower end is fastened at 20 to said rod and whose upper end bears against the face of the bar 15, around the aperture through which said rod passes, so that the tension of said spring is exerted to create a downward and a sidewise pressure upon the knife-carrying frame and yet allow of a vertical movement of the frame when it is desired to raise the bars therefrom the ground, as shown by dotted lines in Fig. 1, at which time the rod 16, which lies freely in the opening in the end of the bar 15, projects through said bar as the frame is raised. The frame may be elevated by means of a chain 21, attached thereto and passing over a pulley 22, carried by a structure 23, mounted on a frame, from whence said chain leads to a point within reach of the operator. The main function of the spring 19, however, is to hold the knife-carrying frame down against the tendency of the knife to ride up on the row of stubbles because of the angle at which the knife is held. This tendency is overcome by the spring, and get the knife-carrying frame is permitted such freedom of movement as to obviate any undue strain upon the knife. The angle at which the knife encounters the stalk or stubble has a tendency to shove the knife-carrying frame sidewise as the stubble is encountered by the blade and resists the progress of the knife. This sidewise movement is provided for by the manner in which the bars of the knife-carrying frame are attached to the main frame; but the knife is yieldingly held to its work by the spring 19, which yields sufficiently to permit the frame to move sidewise, but exerts its pressure to hold the knife in contact with the stubbles, so that a drawing cut is effected, which greatly facilitates the severing of the stalks.

Having thus fully set forth my invention, what I claim as new, and desire to secure by Letters Patent, is—

1. In a device for the purpose set forth, the combination of a portable frame, a knife-carrying frame loosely attached thereto, a knife upon said frame and a spring-actuated rod jointedly attached to the knife-frame for holding said knife yieldingly in position.

2. In a device for the purpose set forth, the combination of a transporting-frame, an auxiliary frame comprising rearwardly and downwardly extending bars whose rear ends bear upon the ground and whose forward ends are jointedly attached to the transporting-frame, a knife mounted on said auxiliary frame to present its edge obliquely to the line of stalks and having its forward end elevated above the rear end thereof, a rigid bar attached to the transporting-frame and extending rearwardly, a rod jointedly attached to the auxiliary frame at its lower end and passing freely through said bar at its upper end, a spring surrounding the upper end of said bar being supported at its lower end by a pin through said rod and bearing at its upper end against said bar and means for raising the rear end of the auxiliary knife-frame.

3. In a device for the purpose set forth, the combination of a portable frame, an auxiliary frame attached thereto to have a slight lateral movement at its rear end, a knife mounted obliquely in the auxiliary frame and means for allowing the auxiliary frame to move laterally against spring resistance.

4. In a device for the purpose set forth, the combination of a portable frame, an auxiliary frame loosely attached thereto comprising knife-supporting bars whose rear ends rest upon the ground, a knife mounted at an angle in said auxiliary frame, a spring-actuated rod pivoted to the knife-frame and a rigid bar mounted on the portable frame supporting the upper end of said rod and through which said rod passes freely.

In testimony whereof I sign this specification in the presence of two witnesses.

JOHN CHAMBERLIN.

Witnesses:
  W. H. BLAKELY,
  A. L. BUNTE.